United States Patent [19]

Berbner et al.

[11] Patent Number: 4,996,289

[45] Date of Patent: Feb. 26, 1991

[54] CONTINUOUS PREPARATION OF AQUEOUS MELAMINE/FORMALDEHYDE PRECONDENSATE SOLUTIONS

[75] Inventors: Heinz Berbner, Moerlenbach; Klaus Ebel, Mutterstadt; Michael Kuczaty, Heidelberg; Bernhard Seid, Frankenthal; Frank P. Woerner, Wachenheim; Hans D. Zettler, Gruenstadt, all of Fed. Rep. of Germany

[73] Assignee: BASF Aktiengesellschaft, Ludwigshafen, Fed. Rep. of Germany

[21] Appl. No.: 394,936

[22] Filed: Aug. 17, 1989

[30] Foreign Application Priority Data

Aug. 25, 1988 [DE] Fed. Rep. of Germany ....... 3828793

[51] Int. Cl.$^5$ .............................................. C08G 12/32
[52] U.S. Cl. .................................. 528/230; 528/232; 528/254
[58] Field of Search ........................ 528/230, 232, 254

[56] References Cited

U.S. PATENT DOCUMENTS 4,458,062  7/1984  Blasing et al. ..................... 528/254
4,668,785  5/1987  Ebel et al. .......................... 544/196

FOREIGN PATENT DOCUMENTS 922441    3/1973  Canada .
76522     5/1970  Fed. Rep. of Germany .
2046496   4/1974  Fed. Rep. of Germany .

OTHER PUBLICATIONS

Derwent Abstract 85-065293/11 of J6 0020-920-A.
Derwent Abstract 84-192362/31 of J5 9109-510-A.
Derwent Abstract 84-192361/31 of J5 9109-509-A.

Primary Examiner—Morton Foelak
Assistant Examiner—Sam A. Acquah
Attorney, Agent, or Firm—Keil & Weinkauf

[57] ABSTRACT

The continuous preparation of melamine/formaldehyde precondensate solutions is carried out by a process in which melamine, formaldehyde and, if required, modifiers and/or additives are metered into a continuous mixer, and the homogeneous mixture is passed into a single-screw or twin-screw extruder, condensed at elevated temperatures, cooled and extruded.

9 Claims, 1 Drawing Sheet

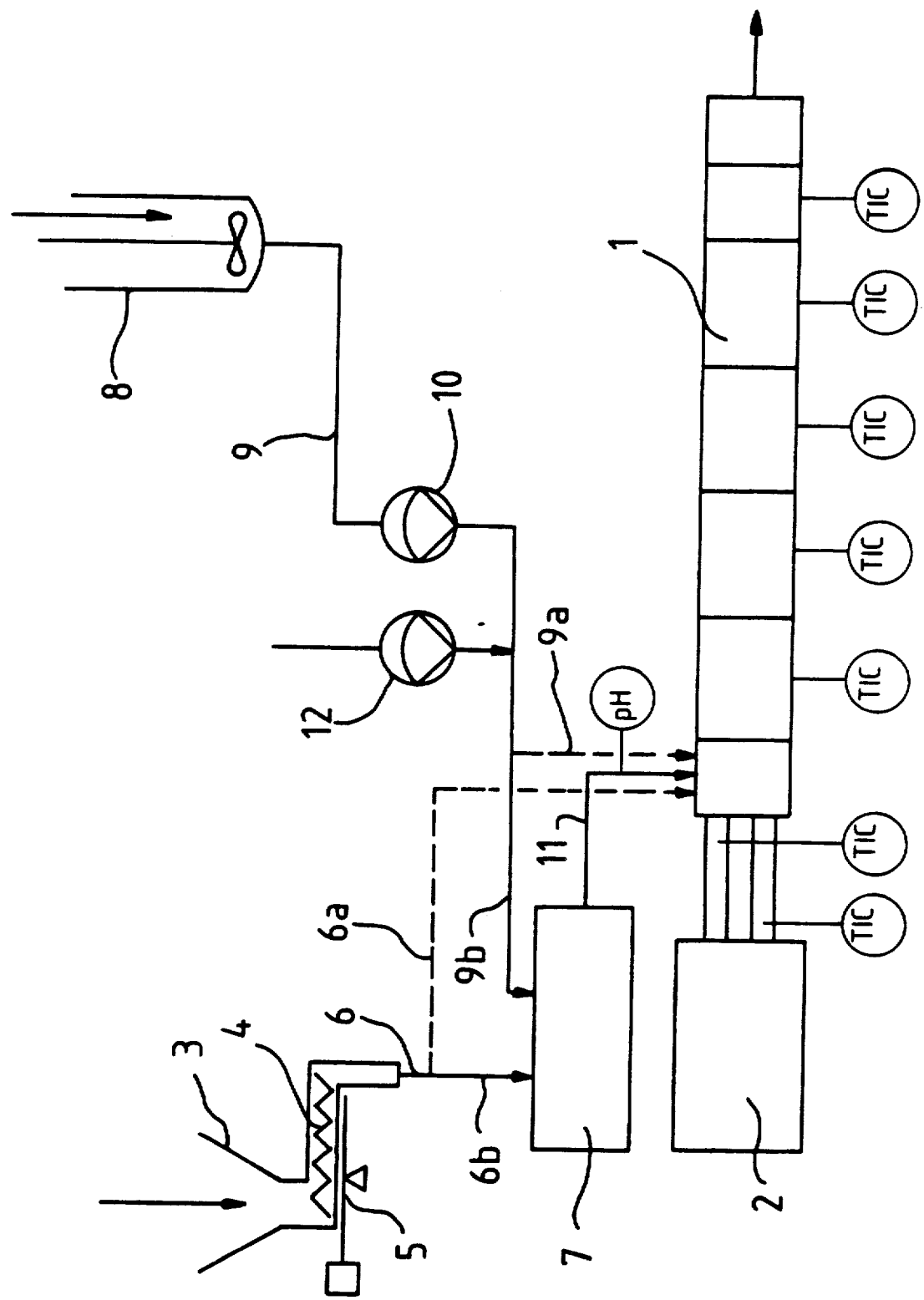

CONTINUOUS PREPARATION OF AQUEOUS MELAMINE/FORMALDEHYDE PRECONDENSATE SOLUTIONS

Aqueous melamine/formaldehyde precondensate solutions are prepared in large amounts and have various uses, especially in the production of particle board. In a conventional process for the preparation of such solutions, the components are introduced into a heatable stirred autoclave and then condensed over a relatively long period at elevated temperatures. This process for the batchwise preparation of products does of course have some serious disadvantages. For example, the temperature distribution in the autoclave is not optimum, which finally leads to different degrees of condensation. The preparation of highly viscous solutions, as required for the production of foams and fibers, is particularly difficult. In the case of viscosities > 50 Pas, this process is virtually useless since the pronounced tack results in adhesion to the wall being so great that the autoclave cannot be emptied.

It is an object of the present invention to provide a continuous process for the preparation of melamine/formaldehyde precondensate solutions which also permits the preparation of highly viscous products.

We have found that this object is achieved by a process for the continuous preparation of melamine/formaldehyde precondensate solutions, wherein melamine and formaldehyde are metered into a continuous mixer, and the homogeneous mixture is passed into a single-screw or twin-screw extruder, condensed at elevated temperatures, cooled and extruded.

In the novel process, a molar ratio of melamine to formaldehyde of from 1:2 to 1:4, preferably from 1:2.5 to 1:3.5, is generally used. The melamine is employed in solid form and the formaldehyde in aqueous solution as, for example, a 40 or 50% strength by weight aqueous solution, or as oligomeric or polymeric formaldehyde in solid form as paraformaldehyde, trioxane or tetroxane. In the last-mentioned case, water is added as a solvent.

In addition to the stated starting components melamine and formaldehyde, further modifiers and additives may also be present.

Examples of suitable modifiers are monoalcohols and diols of not more than 6 carbon atoms which lead to ether formation of the methylolated melamine. Suitable monoalcohols are methanol and ethanol. Suitable diols are ethylene glycol, diethylene glycol, triethylene glycol and propylene glycol.

Alkali metal sulfites and hydrogen sulfites, for example sodium disulfite, sodium sulfite and sodium hydrogen sulfite, may also be present.

Other modifiers are amines and amino alcohols, such as ethanolamine and diethanolamine.

To produce certain properties of the condensate solutions, dicyanodiamide and/or hydroxyalkylmelamines may also be present as modifiers. Particularly suitable hydroxyalkylmelamines are the following compounds:
mono-(2-hydroxyethyl)-melamine,
N,N'-bis-(2-hydroxyethyl)-melamine,
N,N',N''-tris-(2-hydroxyethyl)-melamine,
mono-(5-hydroxy-3-oxapentyl)-melamine,
N,N'-bis-(5-hydroxy-3-oxapentyl)-melamine and
N,N',N''-tris-(5-hydroxy-3-oxapentyl)-melamine.

They can be used for resin modification as pure individual compounds or as mixtures with one another, in each case in the absence of a solvent, as aqueous solutions or as precondensates with formaldehyde. The resins modified with these compounds give foams or fibers having improved mechanical properties, for example improved resilience and/or tensile strength.

Suitable additives are catalysts, fillers, emulsifiers and blowing agents.

Examples of catalysts are formic acid and sulfuric acid. Examples of suitable fillers are fibrous or powdered inorganic reinforcing agents or fillers, such as glass fibers, metal powder, metal salts or silicates, for example kaolin, talc, barite, quartz or chalk, as well as pigments and dyes and flameproofing agents. Suitable emulsifiers are the conventional nonionic, anionic or cationic organic compounds having long-chain alkyl radicals. If the precondensate is further processed to give, for example, foams, an example of a blowing agent which can be concomitantly used is pentane.

The starting components are metered into a continuous mixer, where they are homogenized. The pH of the mixture is brought to 7-14, preferably 8-10, by means of an aqueous alkali solution. The homogeneous mixture is passed into a single-screw or twin-screw extruder, where it is condensed at from 70 to 150° C.

In another process variant, the starting compounds are metered directly into the extruder and condensed therein.

The rotary speed of the extruder is from 1 to 100 rpm, shear rates of from 0.5 to 3,000 $s^{-1}$ occurring. The conveying, kneading and shearing elements of the extruder screws need not meet any special requirements, since the viscosities of the solutions are relatively low. The residence times of the reaction mixtures are from 5 to 90, preferably from 15 to 35, minutes.

A preferred process is shown in the Figure and is described below.

The process is based on a self-purging twin-screw extruder (1) having a drive motor (2). It has proven particularly advantageous if the extruder can be heated or cooled in individual zones, this being controlled by thermonic converters (TICs). The extruder is operated at rotary speeds of from 1 to 100 rpm and barrel temperatures of from 20 to 150° C. A temperature gradient in the conveying direction from 20 through 70-150 to 25° C. has proven useful.

The residence times of the reaction mixture are from 5 to 90, preferably from 15 to 35, minutes.

The solid starting components, such as melamine or paraformaldehyde, are fed via one or more differential metering systems (3) having a conveying screw (4) and a weighing means (5), either directly via the line (6a) to the extruder or are metered, in order to permit the use of a shorter extruder, via the line (6b) into the mixing apparatus (7) which in particular operates continuously. The liquid starting components, such as aqueous formaldehyde, together with any soluble additives are fed from the stirred stock vessel (8) via the line (9) and the metering pump (10), either via the line (9a) to the extruder (1) directly or via the line (9b) to the mixing apparatus (7), where they are mixed with the solid starting components, and the resulting mixture is passed via the line (11) into the extruder (1).

To avoid agglomerates, it is advantageous if the mixer (7) is equipped not only with conveying elements but also with shearing elements. To obtain the pH of from 8 to 10, a 50% strength by weight aqueous sodium hydroxide or potassium hydroxide solution is added continuously by means of pump (12). The pH measurement point is located in the line (11).

The viscosity, the turbidity point and the pot life are used as characteristics for evaluating the precondensates. The viscosity is measured using a plate-and-cone viscometer, normally at 20° C. The precondensate solutions have solids contents of from 40 to 90, preferably from 65 to 85, % by weight, a 76% strength by weight solution having a viscosity of from 100 to 600, preferably from 250 to 450, Pas.

In the measurement of the turbidity point, the water solubility of the resin is checked. 1 part by volume of water and 2 parts by volume of precondensate are mixed. On heating, the precondensate dissolves in the water at a certain temperature and the solution becomes clear. The turbidity point is defined as the temperature at which the solution becomes turbid again on cooling. The turbidity point is a measure of the degree of condensation. The higher the degree of condensation of a precondensate, the higher is the turbidity point. Turbidity points of the precondensate solutions occur at from 40 to 90° C., preferably from 50 to 75° C.

The pot life is defined as the time after which a resin can still be processed after 2% by weight of a catalyst, for example formic acid, are stirred in. The precondensate solutions have pot lives of from 0.3 to 2, preferably from 0.5 to 1.5, hours.

The precondensate solutions can be used for the preparation of adhesive resins, foams or fibers.

EXAMPLE 1

85.7% by weight of 40% strength by weight formaldehyde solution, 6.2% by weight of sodium disulfite, 7.7% by weight of paraformaldehyde and 0.4% by weight of diethylethanolamine were added to a stock vessel (8) provided with a stirrer. After it had been stirred for a short time, the solution could be processed. 36.8% by weight of the solution were metered via a metering pump (10) into a continuous mixer (7). By means of two metering balances (5), 17.4% by weight of paraformaldehyde and 45.8% by weight of melamine were fed to the mixer. At the same time, potassium hydroxide solution was added via a metering pump (12) in an amount such that a pH of 8.5 resulted at the outflow of the mixer. The homogeneous premix was passed into the twinscrew extruder (1). The extruder was divided into zones provided with separate heaters. The inlet temperature was 107° C., the temperature in the middle of the extruder was 110° C. and 112° C., and at the end the solution was cooled to 25° C. The residence time was about 15 minutes. A clear, homogeneous and speck-free solution having the following properties was obtained at the extruder outlet: Molar ratio of melamine to formaldehyde 1:2.75

| Solids content | 81% by weight |
|---|---|
| Turbidity point | 55° C. |
| Viscosity (20° C.) | 275 Pas |
| Density | 1.38 g/l |
| pH | 9.6 |

EXAMPLE 2

The procedure described in Example 1 was followed. 92.1% by weight of 50% strength by weight formaldehyde, 4.4% by weight of dicyanodiamide and 3.5% by weight of sodium disulfite were introduced into the stock vessel. 58.7% by weight of this premix and 41.3% by weight of melamine powder were metered into the continuous mixer. The extruder was operated as in Example 1. A clear, homogeneous and speck-free solution having the following data was obtained:

| Molar ratio of melamine to formaldehyde 1:2.75 | |
|---|---|
| Solids content | 64% by weight |
| Turbidity point | 48° C. |
| Viscosity (20° C.) | 6 Pas |
| pH | 9.7 |

This process also permits the processing of modifiers within wide limits. For example, we have found that when hydroxyethylmelamine is added the viscosity increases to 450 Pas. However, the condensation and processibility do not present any problems in the twin-screw machine. If the precondensate is further processed to, for example, foams, emulsifiers and blowing agents may also be incorporated in the extruder. If the precondensate is further processed to fibers by conventional methods, the catalyst, for example formic acid or sulfuric acid, can be added shortly before emergence, in the final extruder barrel.

We claim:

1. A process for the continuous preparation of an aqueous melamine/formaldehyde precondensate solution, which comprises; metering melamine and aqueous formaldehyde or melamine and formaldehyde in a solid form together with water into a continuous mixer to produce a homogeneous mixture, passing the homogeneous mixture into a single-screw or twin-screw extruder, at elevated temperatures.

2. A process as claimed in claim 1, wherein mono-(2-hydroxyethyl)-melamine or N,N'-bis-(2-hydroxyethyl)-melamine or N,N',N''-tris-(2-hydroxyethyl)-melamine or a mixture of two or three of these compounds in pure form or in the form of a precondensate with formaldehyde is used in addition to melamine and formaldehyde.

3. A process as claimed in claim 1, wherein mono-(5-hydroxy-3-oxapentyl)-melamine or N,N'-bis-(5-hydroxy-3-oxapentyl)-melamine or N,N',N''-tris-(5-hydroxy-3-oxapentyl)-melamine or a mixture of two or three of these compounds in pure form or in the form of a precondensate with formaldehyde is used in addition to melamine and formaldehyde.

4. A process as claimed in claim 1, wherein fillers and other conventional assistants are present.

5. A process as claimed in claim 1, wherein the individual components or the mixture of components are or is passed into a twin-screw self-purging extruder.

6. A process as claimed in claim 1, wherein a molar ratio of melamine to formaldehyde of from 1:2 to 1:4 is used.

7. A process as claimed in claim 1, wherein the reaction mixture is condensed in the extruder at from 70 to 150° C.

8. A process as claimed in claim 1, wherein the condensation is carried out at a pH of from 7 to 14.

9. A process as claimed in claim 1, wherein the reaction mixture is condensed in the extruder at a shear rate of from 0.5 to 3,000 $s^{-1}$.

* * * * *